United States Patent [19]

Scott

[11] Patent Number: 5,036,180
[45] Date of Patent: Jul. 30, 1991

[54] ELECTRICAL INDOOR BROILER

[76] Inventor: Clyde M. Scott, 602 Knights Ave., Gahanna, Ohio 43230

[21] Appl. No.: 449,872

[22] Filed: Mar. 1, 1983

[51] Int. Cl.$^5$ ............................ H05B 3/70; F24C 7/06
[52] U.S. Cl. .................... 219/443; 219/464; 99/446
[58] Field of Search ............... 219/443, 457, 458, 459, 219/462, 464, 465; 99/446, 445, 444, 450, 422

[56] References Cited

U.S. PATENT DOCUMENTS

| | | | |
|---|---|---|---|
| 1,465,478 | 8/1923 | Nielsen | 219/458 |
| 1,591,291 | 7/1926 | Detweiler | 99/446 |
| 1,644,255 | 10/1927 | Kercher | 219/465 |
| 2,091,905 | 8/1937 | Bensel | 219/459 |
| 2,097,793 | 11/1937 | Howell | 99/446 |
| 2,359,983 | 10/1944 | Fry | 219/457 |
| 2,723,617 | 11/1955 | Dreyfus | 99/444 |
| 2,856,502 | 10/1958 | Wolf | 219/443 |
| 3,225,682 | 12/1965 | Savio | 99/450 |
| 3,301,170 | 1/1967 | Beasley | 99/446 |

FOREIGN PATENT DOCUMENTS 2302067  9/1976  France ........................ 219/443

*Primary Examiner*—Teresa J. Walberg
*Attorney, Agent, or Firm*—Anthony D. Cennamo

[57] ABSTRACT

An electric grill-simulated charcoal broiler for use indoors with smoke, grease/fire abatement. The iron grid is somewhat rectangular shaped with horizontal elongated grooves positioned therein for searing the meat and elongated slots to receive and direct the ensuing greases and juices through parallel openings to a water pan positioned thereunder. The electrical heating element positioned directly beneath the iron grid bars is not exposed to the opeings. The grill element has sufficient width to impart the heat directly to the meat by way of convection and conduction. The overall unit is simple in construction and composed of readily detached or removable components for accessability and sanitation, and is self-contained and may be portable.

3 Claims, 2 Drawing Sheets

ELECTRICAL INDOOR BROILER

BACKGROUND

It is commonplace to have an open charcoal burner for the broiling of food. Over the years almost every household has such a burner in it's backyard. The smoke created by this type of burner by the grease falling on the charcoal and the fires created thereby necessarily restricts the use of such a burner to the backyard.

The use of an electric heating element in lieu of the charcoal has also been suggested. However, the grease falling on the hot heating element is no less a risk than that of the charcoal. Further, the flash fires and the excess heat created thereby either become uncontrollable or in most instances give off excessive heat to the meat far beyond that of the proper broiling temperature thus rendering the meat unpallatable.

To control the flame and ensuing smoke there has been used primarily in commercial broilers a pan of water beneath the grease pan so that the grease drippings will be quenched. While these units are splatter free and do reduce the chance of fire, they have not been feasable for domestic use.

Other types of burners also have been suggested to eliminate the grease burning and smoke. It has been suggested in the past that with the use of a low wattage electrical heating element and a pan partially filled with water, flash fires may be controlled. This has not been successful due to the long time to heat the element or presence of water vapor. One such system is that of using air circulators and blowers. Of course, such a system could not be used indoors without exhaust fans, as the smoke problem would be worsened.

SUMMARY OF THE INVENTION

The present invention overcomes the above-noted prior art attendant disadvantages and provides a burner that may be used indoors without the attendant smoke and without affecting the natural cooking of the meat. In the broadest sense the broiler in its preferred embodiment comprises a combination broiler and fryer to preserve the necessary searing of the meat.

The grill of the present invention is not the typical rod; it is composed of an iron grid with slots in it, rectangular bars of metal, thereby providing a substantial cooking surface and searing surface and eliminating the grill effect. Each bar further includes a groove to catch and direct the greases to a pan of water positioned beneath the grid to eliminate fire and smoke. The sides of the grooves will impart to the meat the appearance of the grill searing.

The heating element is positioned completely beneath the bar grid element and is therefore not exposed to the falling greases. Further, the heating element is in direct contact with the bar grill and in this way imparts heat directly to the bars. The spacing between the bars provides the open space for the radiated heat from the heating element to be directed to the meat.

Each component of the system in its preferred embodiment, is of simple construction and each is joined with each other in a simplified manner for ready accessability and sanitation.

OBJECTS

It is accordingly a principal object of the present invention to provide a grill for broiling meat or other foods without the creation of excessive heat, smoke, or flash fires.

Another object of the invention is to provide such a grill but yet insure that the meat is seared in the normal manner of a charcoal burner and the meat is not deficient as to its natural juices.

A further object of the present invention is to provide such a burner that utilizes an electrical heating element in lieu of the charcoals but yet prevents the greases from falling on the element.

Still another object of the invention is to provide such a burner that is comprised of simply constructed components, each of which may be removed or easily detached for accessability and sanitation.

Other objects and features of the present invention may become apparent from the following detailed description when taken in conjunction with the drawings in which:

BRIEF DESCRIPTION OF DRAWINGS

FIG. 2 is an underside view of the broiler unit illustrating the heating element and its relation to the iron grid and FIG. 2A shows in crossection the structural relationship of the components.

DETAILED DESCRIPTION OF DRAWINGS

Figure 1:
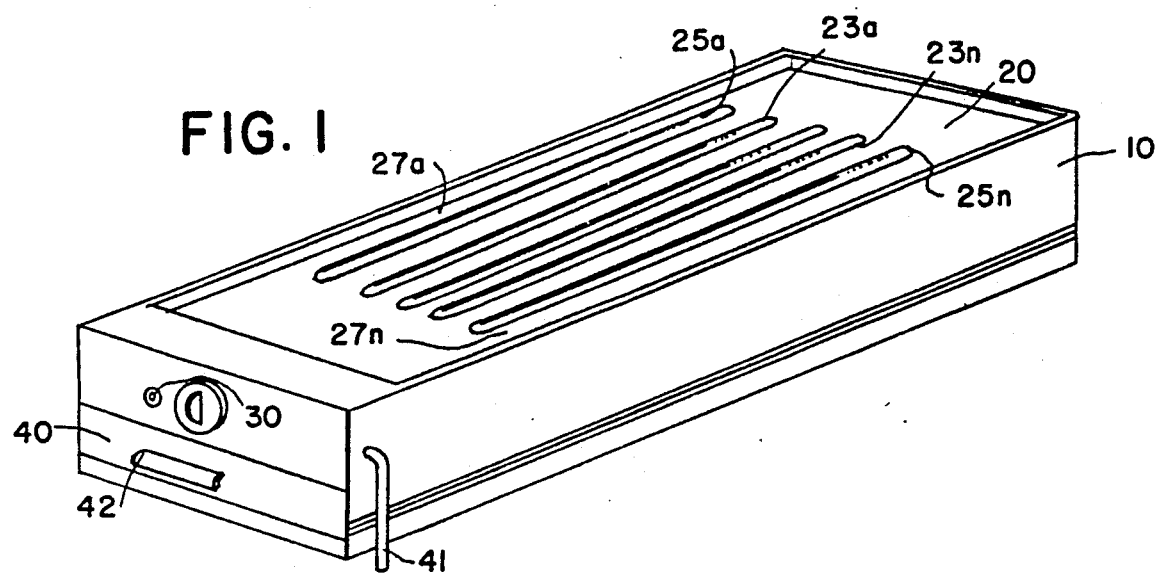
FIG. 1 is a perspective view of the broiler unit of the present invention in its preferred embodiment.

Referring now to the drawings there is illustrated in several views the preferred embodiment of the present invention of a grill-type of charcoal broiler that may be utilized indoors.

In FIG. 1 the completed embodiment is illustrated in perspective. The grid structure comprises a panel 20 having slots formed therein 25$a$ xxx 25$n$. Intermediate the slots 25$a$ xxx $n$, the panel/grid members 27$a$ xxx 27$n$ have formed therein grooves 23$a$ through 23$n$—more clearly illustrated in FIG. 4.

Figure 2:
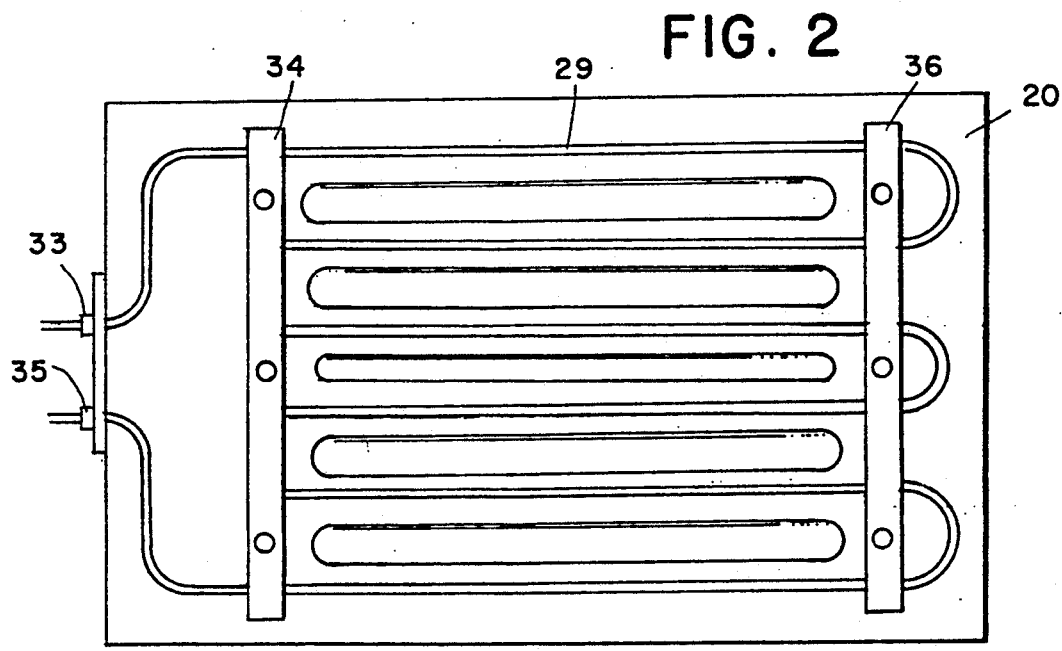
Figure 4:
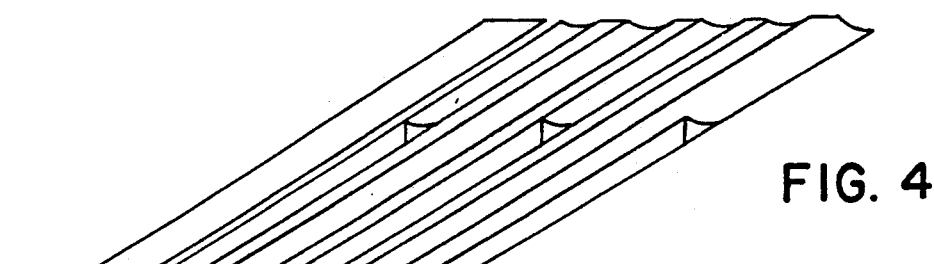
FIG. 4 is a crossectional view of the iron grid element illustrating the relative position of the heating element and the grooves in the grid panel.

Positioned directly below each of the grid members 27$a$ xxx $n$, there is in touch contact therewith a branch of the heating element 29$a$ xxx $n$; again as more explicitly illustrated in FIG. 4. With reference to FIG. 2 the entire underside arrangement of the panel is demonstrated. In this view the electrical heating element 29 is shown in its entirety. With this arrangement it can be appreciated that the entire grid panel is directly heated by the heating element 29.

Again referring to FIG. 4 taken together with FIG. 2A, the grid elements 27 have formed therein the grooves 23. The remaining outside portion of the grid elements 21$a$ xxx 21$n$ are ridge-like to impart to the meat or food cooked, singed lines much in the nature of those that would have resulted from charcoaling the food. The purpose of the grooves 23 is to receive the grease from the cooking of the meat. The grooves 23 are slanted in one direction or the other to cause the grease to drip to an opening and thence to the water pan 40 below. It can be appreciated that the overall size of the water pan, to be effective, must be greater than that of the heating element and panel 20.

Figure 3:
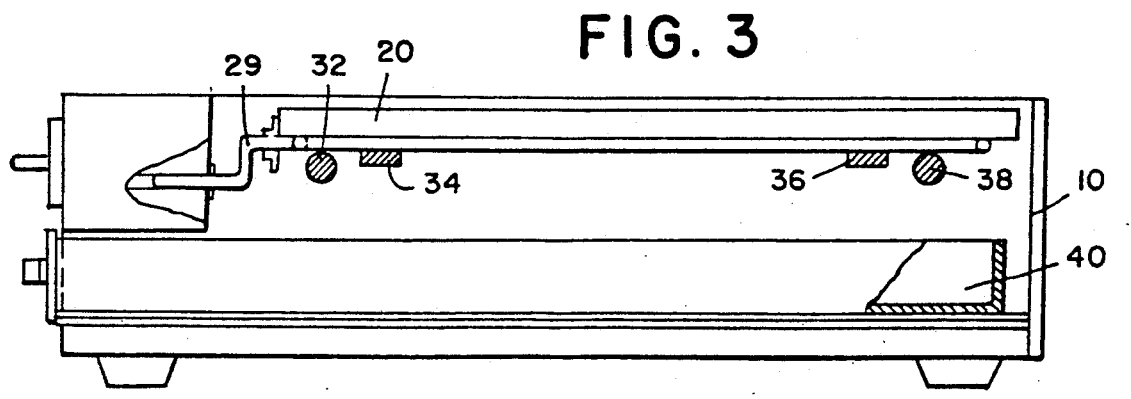
FIG. 3 is a side view partly in section with the side panel removed to illustrate the support structure for the heating element and grill panel.

The simplicity of the construction of the preferred embodiment, that lends itself to accessability and removal of components, is illustrated in FIG. 3 in a side view with the side panel removed for illustrative purposes.

The heating element 29 is a plug in unit—via terminals 33 and 35 of FIG. 2, and has associated therewith the thermostat and switch arrangement 30. The heating element 29 is a complete unit and is bound in rigidity by the clamps 34 and 36. Cross members 32 and 38 are fixedly positioned to the cabinet 10 in a manner to support in a horizontal position the heating element unit 29 and also the one piece grid 20 thereon.

Below the grid and heating element unit 29 and resting in the lower portion of the cabinet 10 is the water pan 40 as shown in FIG. 3 and FIG. 1. The water pan 40 has a front piece/handle 42 for insertion and removal of the pan 40 from the slot in the lower portion of the front panel of the cabinet 10.

Figure 5:
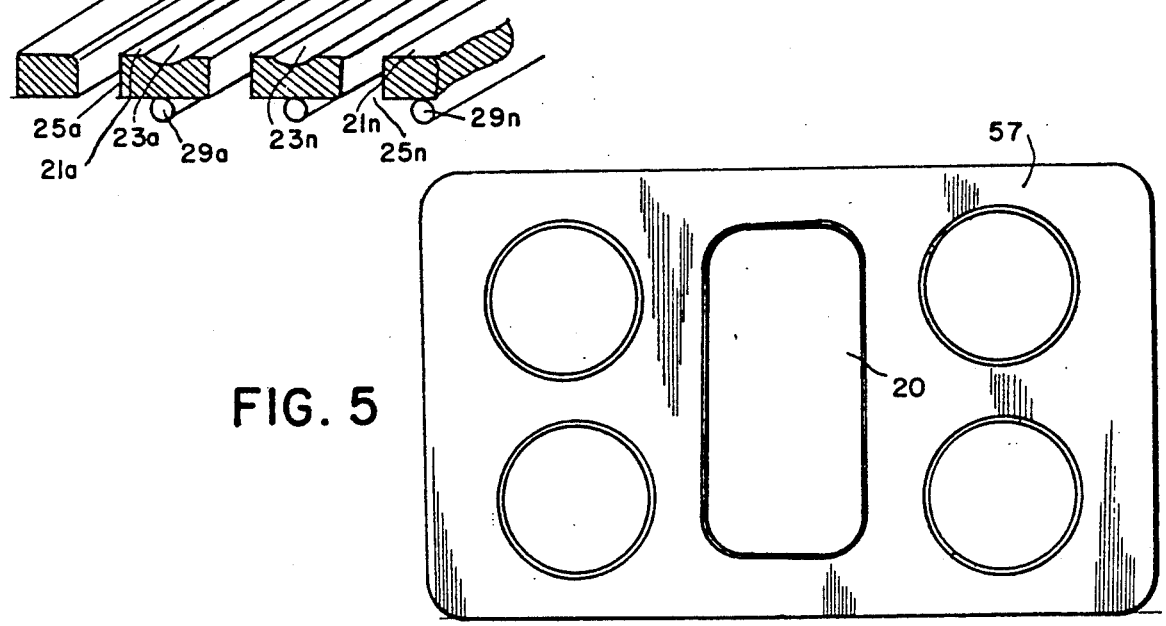
FIG. 5 is illustrative of the preferred embodiment of the invention as would be utilized in an indoor cooking range.

The entire unit comprising the preferred embodiment of the present invention is readily manufactured as a separate unit for portability and use outdoors and inside the home. Also the entire unit may be adapted to be incorporated in the range/oven of conventional structure as shown in FIG. 5. The unit may be removed from the cabinet 10 and inserted in the range 55. The exposed grid 20 would conform to the other heating units of the range top 57.

Figure 6:
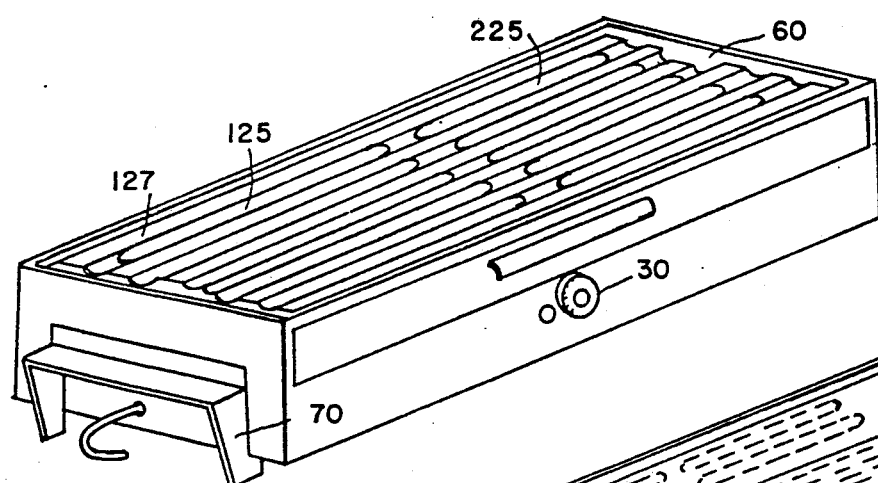
FIG. 6 is an alternative arrangement for the slot/groove grid top utilizing a pair of cooking surfaces.

With reference now to FIG. 6 there is illustrated an alternative structure of the grid unit of the preferred embodiment. In this structure there is a pair of slot/-grooves in the grid. That is the grooves 127 and 227 are much the same as the grooves 27 of FIGS. 1 and 4. In this instance the grooves and slots each cover approximately one halve of the longitudinal surface of the grid. The surface is enlargened; or in some instances it may be desireable to only utilize one-half of the surface.

Figure 7:
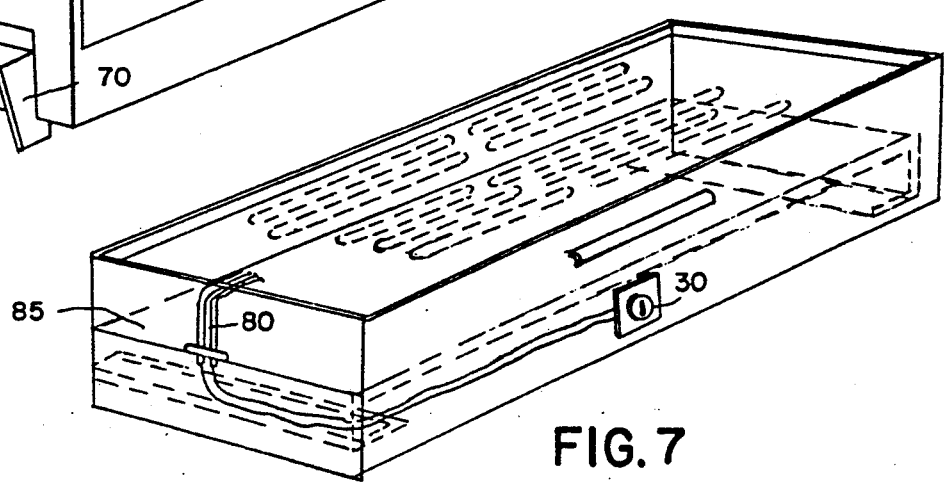
FIG. 7 is an alternative arrangement for the electrical unit in the broiler of the preferred embodiment.

In FIG. 7 there is illustrated another arrangement of the wiring of the electrical unit in the preferred embodiment. In this way there is provided a front (or rear) plug-in for a conventional outlet. The wiring 80 is fixedly a part of the cover unit 85. The cover unit 85 in turn is a thermo cover for the electrical assembly.

Although certain and specific embodiments have been shown it is to be understood that departures and modifications may be had thereto without departing from the spirit and scope of the invention as exemplified herein.

I claim:

1. A broiler comprising an elongated, rectangularly shaped support structure,
   an electrical heating element structurally supported and positioned in said structure,
   a source of electrical potential and plug-in means connected to said heating element for utilization of the electrical potential from said source,
   a single structure grid panel having parallel longitudinal slots formed therein along a length thereof,
   said electrical heating element comprising a plurality of longitudinal elements in touch contact with an underside of said grid panel in a position intermediate of each of said slots and wherein said longitudinal elements are removed from exposure to said slots in said grid panel;
   said grid panel intermediate said slots having grooves formed therein longitudinally and parallel to said slots and wherein said grid panel has an opening in one end thereof and said grooves are slanted toward said opening,
   an outside portion of said grooves having a ridge configuration,
   a water pan of a diameter and width at least as great as that of the aforesaid heating element and grid panel, positioned in a lower portion of said support structure for said broiler directly beneath the grid panel and heating element.

2. The broiler of claim 1 wherein the overall broiler structure is self-contained and said support structure is a cabinet.

3. The broiler of claim 1 wherein the overall broiler structure is adaptable to a conventional oven/range.

* * * * *